United States Patent
Subramanian et al.

(10) Patent No.: US 11,074,601 B2
(45) Date of Patent: Jul. 27, 2021

(54) REAL TIME PERSONALIZED PRICING FOR LIMITED INVENTORY ASSORTMENTS IN A HIGH-VOLUME BUSINESS ENVIRONMENT

(71) Applicant: International Business Machines Corporation, Armonk, NY (US)

(72) Inventors: Shivaram Subramanian, New Fairfield, CT (US); Pavithra Harsha, White Plains, NY (US); Rajesh Kumar Ravi, Yorktown Heights, NY (US); Markus R. Ettl, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 363 days.

(21) Appl. No.: 15/889,942

(22) Filed: Feb. 6, 2018

(65) Prior Publication Data

US 2019/0244230 A1    Aug. 8, 2019

(51) Int. Cl.
| | |
|---|---|
| *G06Q 30/02* | (2012.01) |
| *G06Q 10/08* | (2012.01) |
| *G06N 3/08* | (2006.01) |
| *G06Q 10/02* | (2012.01) |
| *G06F 17/11* | (2006.01) |

(52) U.S. Cl.
CPC ......... *G06Q 30/0206* (2013.01); *G06N 3/08* (2013.01); *G06Q 10/02* (2013.01); *G06Q 10/087* (2013.01); *G06Q 30/0239* (2013.01); *G06F 17/11* (2013.01)

(58) Field of Classification Search
CPC .. G06Q 30/0206; G06Q 10/02; G06Q 10/087; G06Q 30/0239; G06N 3/08; G06F 17/11
See application file for complete search history.

(56) References Cited

U.S. PATENT DOCUMENTS

| | | | | |
|---|---|---|---|---|
| 6,085,164 A | * | 7/2000 | Smith | G06Q 10/02 705/5 |
| 6,341,268 B2 | | 1/2002 | Walker et al. | |
| 7,640,192 B1 | * | 12/2009 | Givoly | G06Q 30/06 705/26.4 |

(Continued)

OTHER PUBLICATIONS

Aydin, Goker & Ziya, Serhan,"Personalized Dynamic Pricing of Limited Inventories", 2009, Informs, Operations Research, vol. 57, No. 6, pp. 1523-1531 (Year: 2009).*

(Continued)

*Primary Examiner* — George Chen
*Assistant Examiner* — Wayne S. Murray
(74) *Attorney, Agent, or Firm* — Amin, Turocy & Watson, LLP

(57) ABSTRACT

A system that compresses data during neural network training. A memory stores computer executable components and neural network data, and a processor executes computer executable components stored in the memory. An anticipatory value of inventory (VOI) optimization component calculates optimal VOI and prices for immediate-future inventory levels in parallel and writes latest price updates for respective states to a price stack; and a recommendation component provides customized pricing recommendation for a product relative to a unique customer as a function of the latest price updates for respective states to the price stack.

20 Claims, 11 Drawing Sheets
(9 of 11 Drawing Sheet(s) Filed in Color)

(56) References Cited

U.S. PATENT DOCUMENTS

| | | | |
|---|---|---|---|
| 9,626,646 B1 | 4/2017 | Ettl et al. | |
| 10,509,685 B2* | 12/2019 | Gong | G06F 9/5077 |
| 2002/0194794 A1* | 12/2002 | Hill | E04H 12/2292 |
| | | | 52/40 |
| 2002/0198794 A1* | 12/2002 | Williams | G06Q 10/06 |
| | | | 705/28 |
| 2003/0014325 A1 | 1/2003 | Biffar et al. | |
| 2003/0154142 A1* | 8/2003 | Ginsburg | G06Q 30/02 |
| | | | 705/28 |
| 2005/0060525 A1* | 3/2005 | Schwartz, Jr. | G06F 9/4411 |
| | | | 713/1 |
| 2007/0043655 A1* | 2/2007 | Phillips | G06Q 40/02 |
| | | | 705/38 |
| 2010/0100506 A1* | 4/2010 | Marot | G06Q 30/02 |
| | | | 705/400 |
| 2012/0209639 A1 | 8/2012 | Chan et al. | |
| 2014/0156401 A1* | 6/2014 | Carr | G06Q 30/0255 |
| | | | 705/14.53 |
| 2015/0012467 A1* | 1/2015 | Greystoke | G06Q 30/0619 |
| | | | 706/12 |
| 2015/0100354 A1* | 4/2015 | Horowitz | G06Q 10/02 |
| | | | 705/5 |
| 2015/0100384 A1 | 4/2015 | Ettl et al. | |
| 2015/0100869 A1* | 4/2015 | Sunshine | G06Q 30/0202 |
| | | | 715/205 |
| 2015/0332298 A1 | 11/2015 | Ettl et al. | |
| 2017/0278173 A1 | 9/2017 | Ettl et al. | |

OTHER PUBLICATIONS

Lin, Kyle Y., "Dynamic pricing with real-time demand learning", 2006, European Journal of Operational Research, vol. 174, Issue 1, pp. 522-538 (Year: 2006).*

Lin, "Dynamic pricing with real-time demand learning," European Journal of Operational Research 174, No. 1 (2006): 18 pages.

Samadi, et al., "Optimal real-time pricing algorithm based on utility maximization for smart grid," In Smart Grid Communications (SmartGridComm), 2010 First IEEE International Conference on, pp. 415-420. IEEE, 2010.

Cross, et al., "Milestones in the application of analytical pricing and revenue management," Journal of Revenue and Pricing Management 10, No. 1 (2011): 20 pages.

wiser.com, "Ready for Takeoff: Why Dynamic Pricing is a Must for Ecommerce Retailers," Retrieved: Dec. 20, 2017, 4 pages.

Mims, "The High-Speed Trading Behind Your Amazon Purchase," Retrieved: Dec. 20, 2017, 1 page.

oracle.com, "Operationalize Big Data Analytics at the Point of Interaction," Retrieved: Dec. 20, 2017, 5 pages.

Bubeck, et al., "Regret Analysis of Stochastic and Nonstochastic Multi-armed Bandit Problems," arXiv:1204.5721v2 [cs.LG] Nov. 3, 2012, 130 pages.

Russo, et al., "Learning to Optimize Via Posterior Sampling," arXiv:1301.2609v5 [cs.LG] Feb. 3, 2014, 29 pages.

* cited by examiner ical field

REAL TIME PERSONALIZED PRICING FOR LIMITED INVENTORY ASSORTMENTS IN A HIGH-VOLUME BUSINESS ENVIRONMENT

TECHNICAL FIELD

The subject disclosure relates generally to a method of real time personalized pricing based on "Value of Inventory" (VOI), that can vary pricing on demand for customers based on a systematic process that can accurately and rapidly update the VOI, exploit price trade-offs net margins, utilize predicted future customer profiles, and preserve high value anticipated inventory until an optimum time to drive an increased level of revenue over current pricing methods.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that facilitate the production of a final product using neural networks in a context are described.

Currently, an organization's revenue management system and pricing lack the ability to accurately estimate the "Value of Inventory" of premium products (e.g., airline seats, hotel rooms, etc.). This prevents a company from maximizing revenues and catering to preferences of most loyal customers. This subject innovation is a method and system to introduce real time on demand personalized pricing for customers based on factors such as time to departure, potential customer history, predictive data about future customer preferences and the (VOI) value of inventory. The system will fluidly price seating based on multiple data sources while focusing on attempting to reserve premium seats for high value customers. The system learns customer preferences along with willingness to pay over time. Gathered data along with information regarding amount of finite or limited inventory remaining is combined to calculate a numerical value of inventory and its potential change in value after customer selection (e.g., whether an offer is accepted or declined). For example, if a customer accepts an offer, the value of remaining inventory is modified in real time and therefore the pricing offered to the next customer will change according to a best predictive analysis the system can produce so as to facilitate higher revenue stream.

This innovation employs a novel manner that pre-calculates prices and VOI for real time personalization. The innovation can work with no initial historical data and continue to learn and build from that point on. Pre-calculations assist in an entire computational process of predicting most likely following customer requests. In such case, the innovation can select an anticipated requested seat from a "most likely pre-generated stack" instead of performing an entire calculation. This can limit lag time involved in producing a response to the customer. The innovation can also factor in external input such as popular events (e.g., conventions, sporting events, etc.) to formulate a more revenue friendly price that would be in sync with a requesting customer.

Mathematical models such as a Bayesian network, a neural network, hidden Markov model (HMM) or a support vector machine model can provide predictive analysis of future product requests and potential customer behavioral patterns that can lead to change actions to improve future revenue. Based on the information this innovation gathers, it can also proceed to vary pricing even within common groups such as the economy class. As typical airlines provide a flat fee for an economy class ticket, this method will consider various factors within that class to modify economy class pricing over time based on the systems perceived value of the remaining inventory.

According to an embodiment, a system for compressing data during neural network training, comprises a memory that stores computer executable components and neural network data. A processor that executes computer executable components stored in the memory. An anticipatory value of inventory (VOI) optimization component that that calculates optimal VOI and prices for immediate-future inventory levels in parallel and writes latest price updates for respective states to a price stack.

In accordance with yet another embodiment, a computer-implemented method, a recommendation component that provides customized pricing recommendation for a product relative to a unique customer as a function of the latest price updates for respective states to the price stack.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
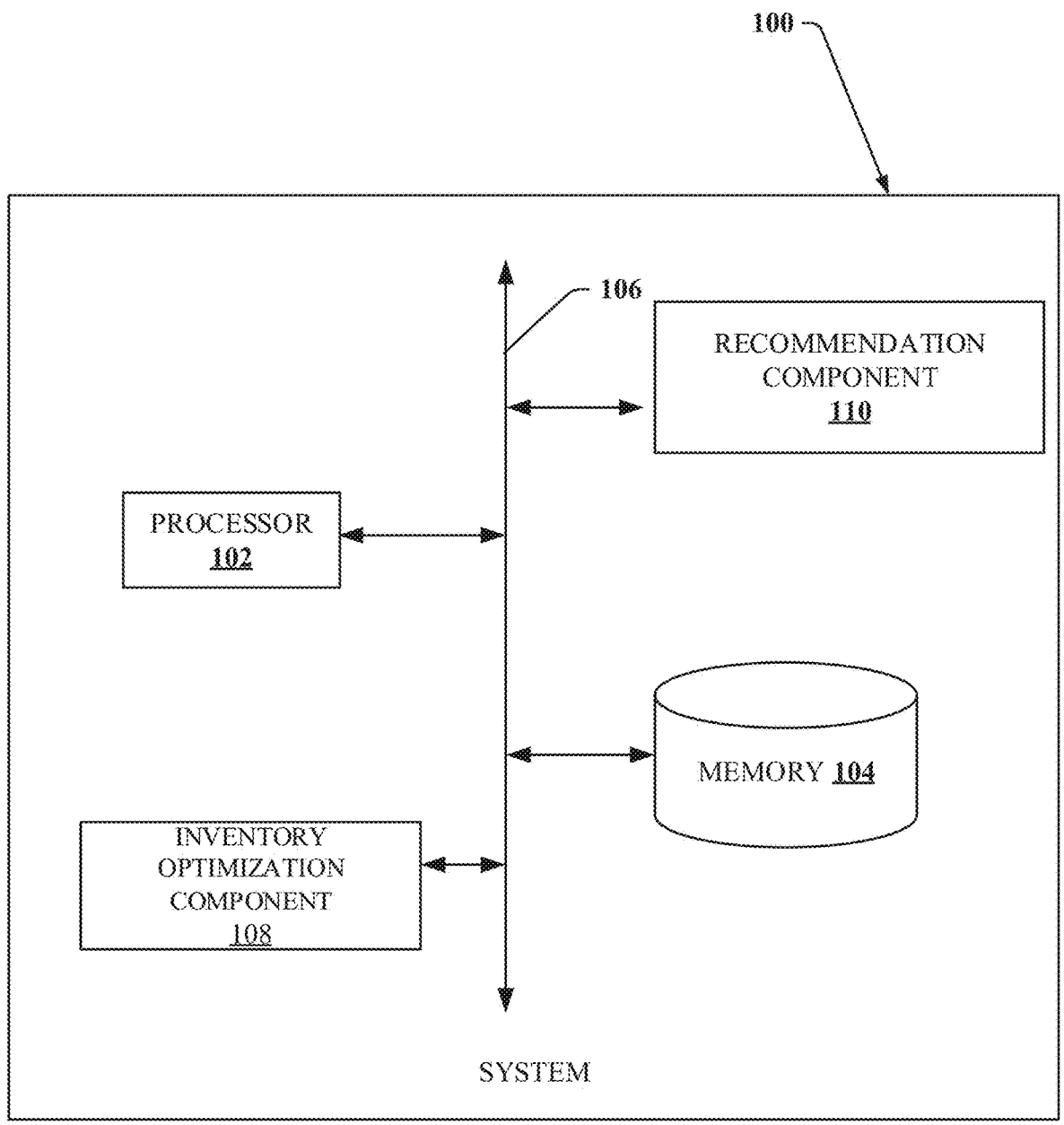
FIG. 1 illustrates a block diagram of an example system implemented that can access data, an anticipatory VOI (value of inventory) component that can calculate optimal VOI and prices for immediate and future inventory levels in parallel and produces price updates for respective states to a price stack. It also contains a recommendation component that provides customized price recommendation for a product relative to a unique customer as a function of the latest price updates for respective states to the price stack.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Currently there are various methods businesses utilize to optimize customer based pricing. Companies often employ revenue management systems optimization models to handle many levels and many classes of pricing. Some conventional systems provide a "shadow" based pricing as prices are updated multiple times a day. However, these systems lack an ability to support on-the-fly customer-mix and customer preference processes which could dynamically impact remaining value of inventory. The VOI of limited inventory is a large scale multiperiod nonconvex problem (MNP) and current pricing methods typically assume fixed prices, but this means the future is fixed so the VOI numbers are incorrect. A facet of the innovation is to use a distributed optimization approach that will continually update VOI and prices in real time (e.g., a few milliseconds). The innovation deconstructs the MNP into one dimensional searches in parallel to interrogate and update customer persona and single period pricing problems. To support this functionality, a rapid future value of inventory (FVOI) instantaneous updating algorithm that syncs with a longer-term learning algorithm (e.g. reinforcement learning) is implemented.— This updating algorithm for the FVOI is a novel aspect. The longer-term algorithm focuses in part on customer history, preferences, and other factors that may impact future pricing strategy while the VOI algorithm focuses in part on immediate analysis and response back to the customer. This innovation can also update value of product alternatives within a core offering, such has various seats all within an economy class section. This subject innovation incorporates some key new attributes and methodologies that can provide a more robust and accurate level for a final product delivered to a customer. This in turn can lead to greater margins in an aggregate and therefore greater revenue.

Many existing systems provide a "Myopic" or "Period" based pricing. Myopic pricing works well with unlimited inventory but is sub-optimal for finite or limited inventory. In "Myopic" pricing, high value customers may express frustration with limited availability of premium seats as there was no method to preserve them for future use. Periodic or dynamic pricing is a better alternative but may not produce an optimum result as it doesn't consider historical customer mix, customer preferences and VOI, which can lead the price to disconnect with remaining inventory. This innovation's intelligent learning algorithm may also completely restrict access to premium seating until it deduces an optimum time window has arrived. This is a benefit as it utilizes customer prediction and VOI to drive pricing equations. This innovation takes many factors into account for its calculations and provides an offer to a customer that favors larger margins up to and including the day of departure. It is more likely to service high value customers appropriately and entice greater loyalty.

The innovation can use time as a key variable for its calculations. As the time to departure decreases, the innovation recognizes type of customer expected throughout a remaining period. This predictability combined with remaining VOI is used to calculate subsequent price offers. Based on historical and learned data, factors such as "willingness to pay" and total expected number of future customers are also incorporated in its methodology. As inventory becomes more constrained, the innovation differentiates and reprices the VOI accordingly. After each request and offer, there are two updates that can occur, first a longer-term update for future historical data mining (e.g., data such as "willingness to pay", cost, preference, etc.) and the second update which is instantaneous and updates the VOI and the price. An example of this method would be after a customer accepts or declines a certain price offer, the methodology can reprice the VOI and the following customer would be submitted a different price.

The innovation can be implemented over a distributed network architecture to offload computing power required over various processing devices. This sliced work load process would assist in producing a rapid response to a customer's request. The innovation is consistently updating prices to remain compatible with the inventory so the prices and remaining inventory stay in sync. The innovation can also cross check risks based on filling in seats against possibly leaving empty seats and losing potential revenue. Such distributed network infrastructure enables a pricing system to rapidly re-sync personalized prices and VOI over lifetime of a significant number of products concurrently offered to a high volume of customers.

FIG. 1 illustrates a block diagram of an example, non-limiting system 100 that can facilitate a process of assessing and identifying a large amount of network data, and using machine learning, training a neural network or other type of model to determine risk components, and generate predictive recommendations to remediate vulnerabilities and provide optimum results in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, an anticipatory value of inventory (VOI) optimization component 108, and a recommendation component 112. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, a memory 104 can store computer executable components executable by the processor 102. A VOI optimization component 108 can be broken up into various smaller components in which each smaller component could have a vital functional role. Functions such as calculating risk of existing pricing trade-offs, updating the VOI and pricing in real time after customer feedback along with conducting parallel searches to capture customer mix data. Various sampling methods such as Thompson sampling can also be implemented by either 108 or 110. The recommendation component 110 can compile historical customer data and process updated customer profile data to develop a "most likely stack" or a historical database carved up into multiple categories. The VOI component 108 can pre-calculate prices and value of inventory in real time to offer a customer most revenue friendly options.

Either of these components can also potentially handle group requests such as a family of three or four using the same methodology. Any suitable predictive model can be employed such as for example: a logistical regression model; a Bayesian network; a neural network; hidden Markov model (HMM); or a support vector machine (SVM). Customer history can include at least one of the following: seating preference, typical time of commitment, willingness to pay, and other significant factors that can be utilized in the calculations. Either component 108 or 110 can utilize distributed architecture to support high speed storage, various programming methods and languages.

The various components (e.g. inventory optimization component 108, recommendation component 110, and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

Embodiments of devices described herein can employ artificial intelligence (AI) to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform many functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 2:
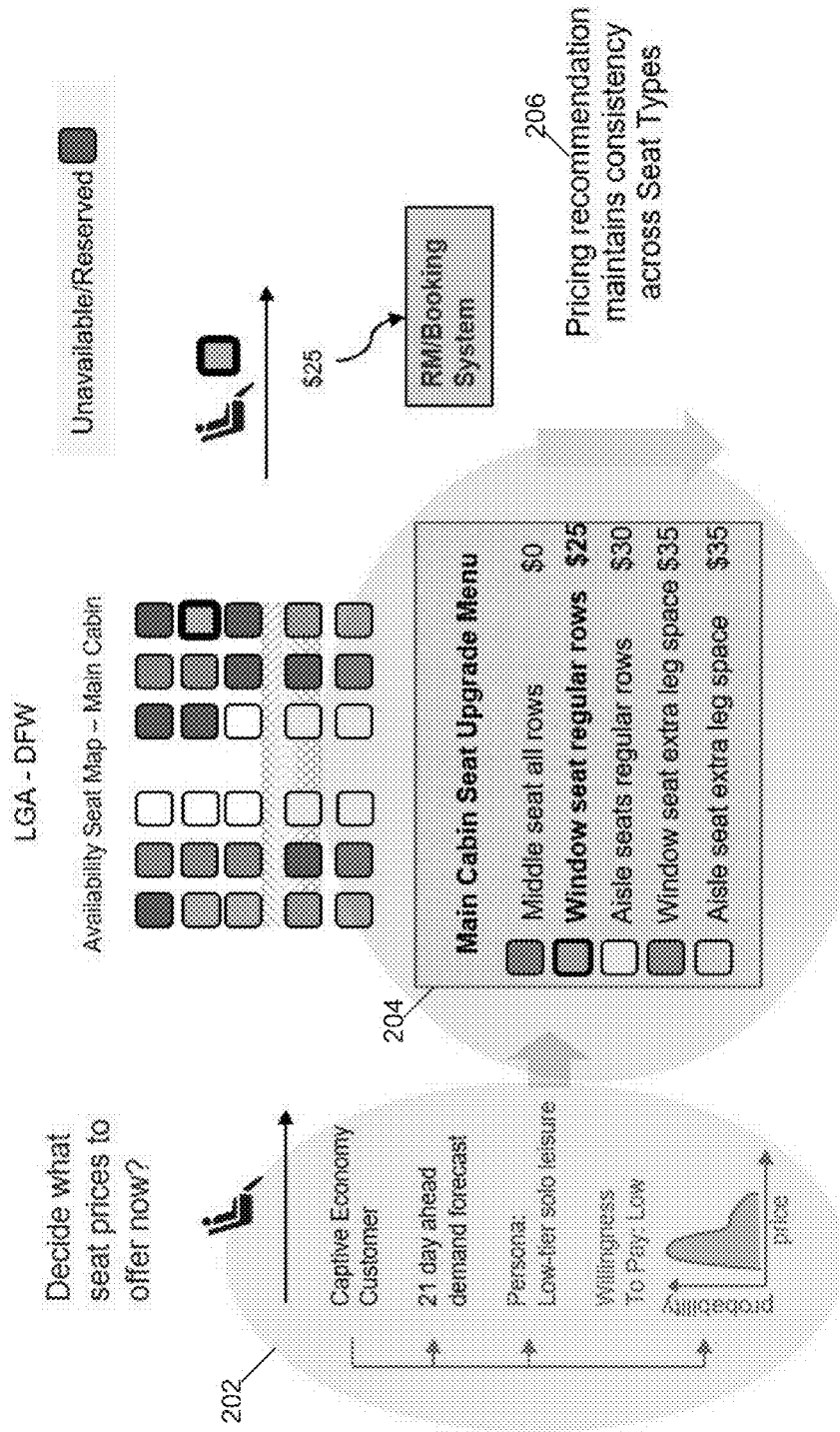
FIG. 2 illustrates a typical 21 days in advance booking attribute diagram.
Figure 4:
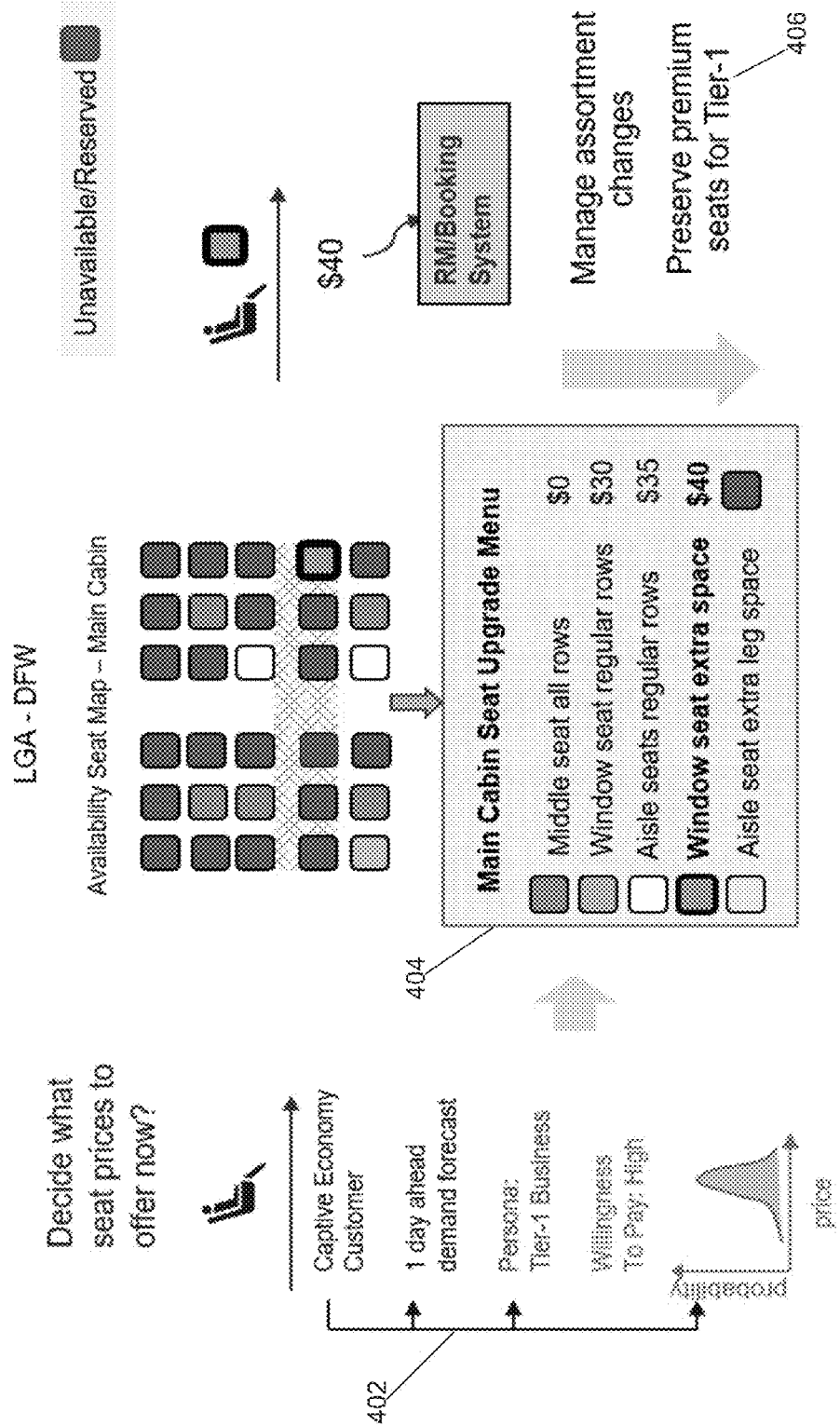
FIG. 4 illustrates a 1 day in advance booking attribute diagram.

FIG. 2 illustrates a typical 21 days in advance booking attribute diagram. Notice that on 202, the price profile is a low tier customer (e.g., an individual or family well ahead of departure looking for the cheapest fare) who's willingness to pay factor is on a minimum side. As the graph in green reflects, the higher the price the less chance the customer can pay. The menu of availability 204 displays the various upgrade menu for seats within the same cabin and has a certain price distribution based on preference. The price at this point (206) remains consistent among seat types, such as every window seat in a regular row is S25 independent of which seat and how may there remaining. Also, note the window seat with extra leg space is S37, this seat can be considered a premium seat for our purposes. This can be considered a baseline price structure for this example. FIGS. 2 and 4 will subsequently follow up on this price strategy using the invention.

Figure 3:
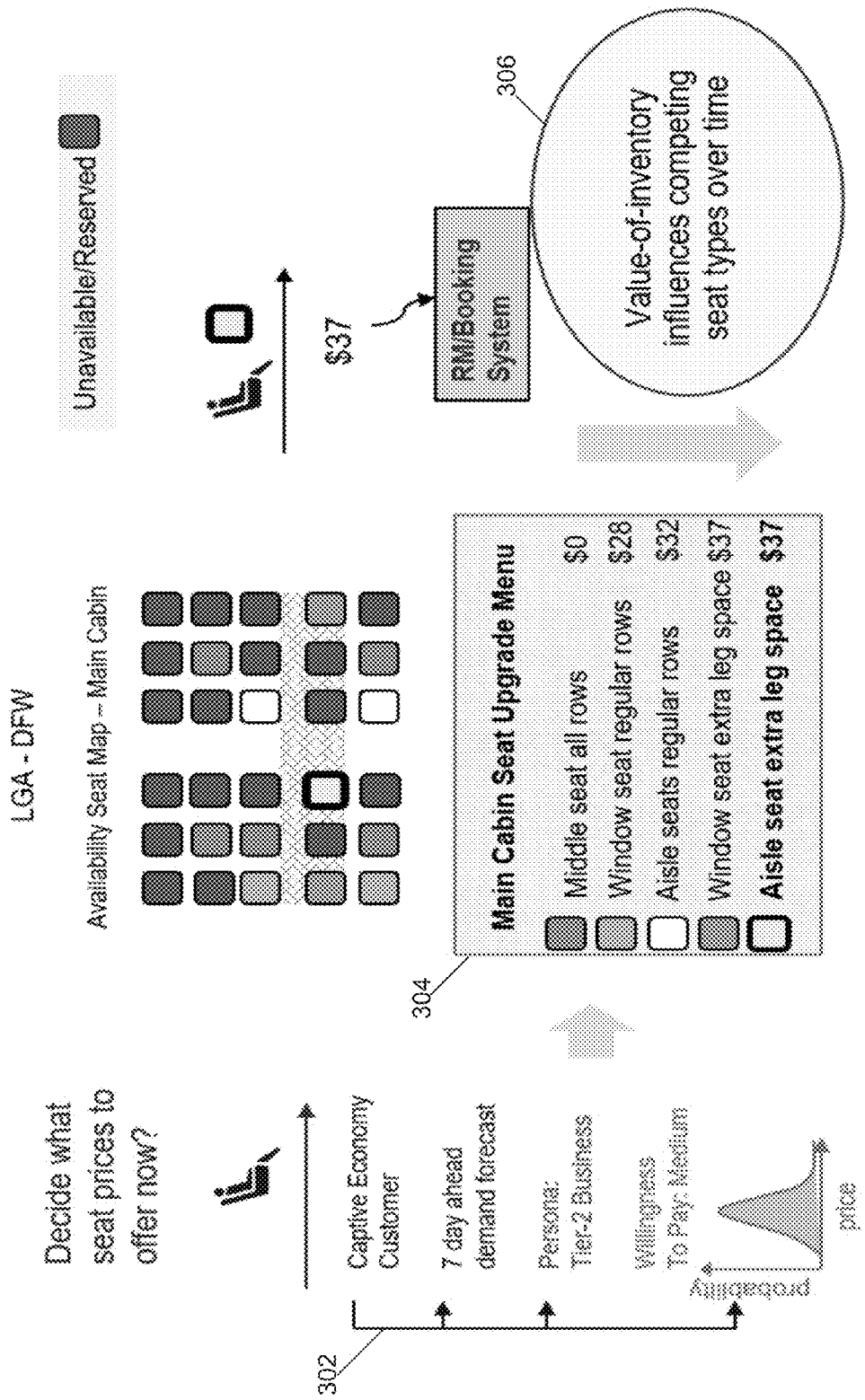
FIG. 3 illustrates a 7 day in advance booking attribute diagram.

FIG. 3 illustrates a 7 day in advance booking attribute diagram. Notice that on 302, the price profile is a Tier-2 business customer (e.g., a medium level typical customer requiring a flight but willing to pursue the best fare he/she can) who's willingness to pay factor is about in the middle. As the graph in green reflects, the higher the price the less chance the customer can pay. The menu of availability 304 displays the various seats within the same cabin and has a certain price distribution based on preference. The price at this point has been modified based on time and VOL Notice that in 304 that the typical window seat in a regular row has move from S25 to S28 as the total number of seats available has been reduced (the red unavailable seats have been increased). The window seat with extra leg space is now S37 for a similar adjustment. The method has considered the decreased inventory, time to departure and likely other factors such as customer mix, customer history, etc. from its historical tracking. As 306 indicates, the VOI has started to influence pricing as seats of various types become occupied. This is a novel concept for this invention.

FIG. 4 illustrates a 1 day in advance booking attribute diagram. Notice that on 402, the price profile is a Tier-1 business customer (e.g., a higher level typical businessman requiring a flight and willing to pursue the best seat he/she can get) who's willingness to pay factor is high. The menu of availability 404 displays the various seats within the same cabin and has a certain price distribution based on preference. The price at this point has been modified based on time and VOL Notice that in 404 that the typical window seat in a regular row has move from S25 to S30 now as the total number of seats available has been reduced again. It's important to note the method has still preserved a premium seat 406 (e.g., as shown S40 seat in brown) The method has considered the decreased inventory, time to departure and the concept of saving premium seats for an optimum window where the system predicts the premium customer is likely to purchase.

Figure 5:
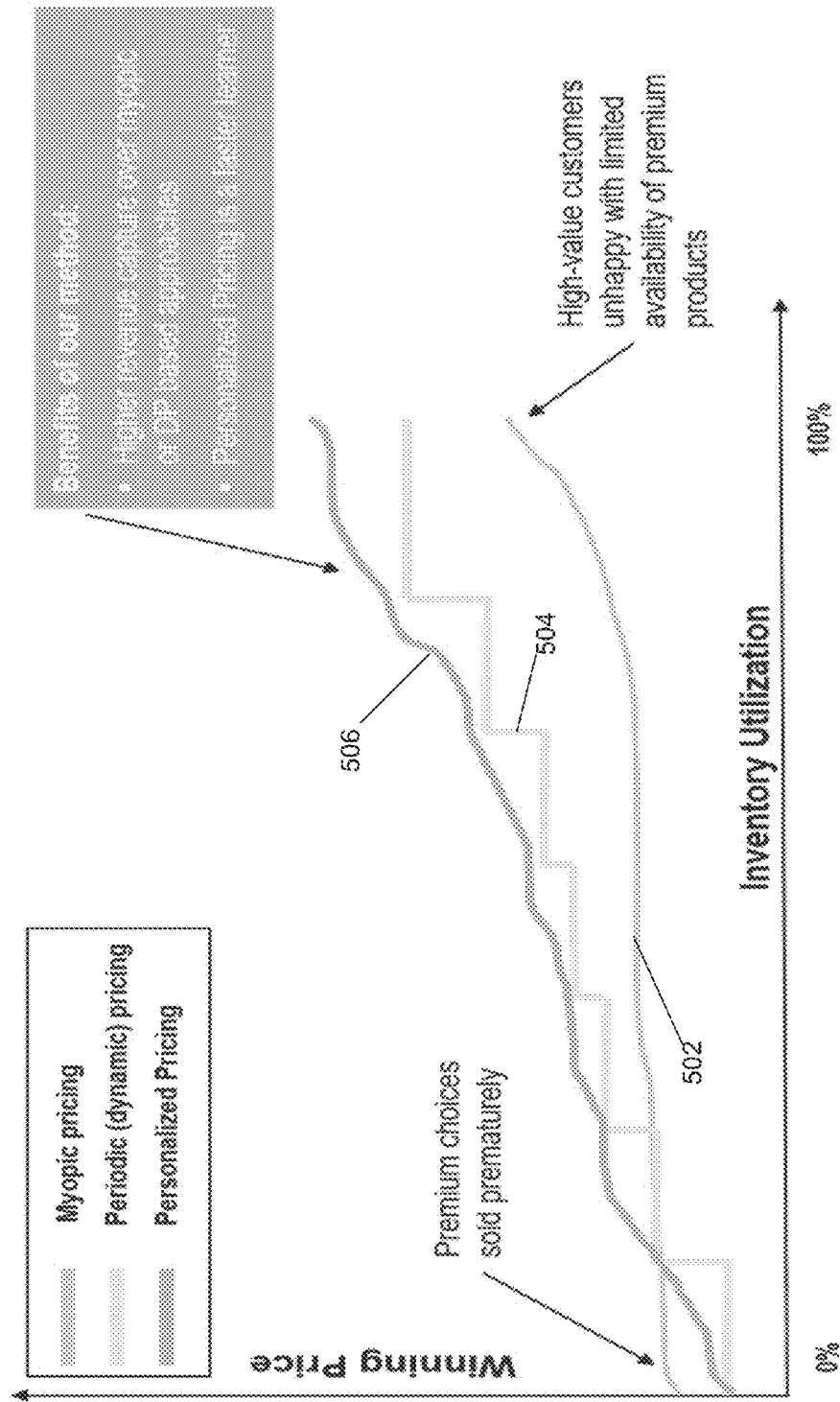
FIG. 5 illustrates an inventory versus price graph and the various pricing methods chart pattern for each method.

FIG. 5 illustrates an inventory versus price graph and the various pricing methods chart pattern for each method. Current methods such as Myopic (502) produce the least amount of revenue at the consumption of the inventory cycle, and leaves the premium customer with the least amount of preferable options near the departure window. The price curve is relatively flat and shows very little price increase until the very end of the product life. As the dynamic price method (504) reflects an improvement over the Myopic method, it does not take into count the entire set of factors that the invention of personalized pricing does (customer history, customer preference, immediate change in VOI after each customer transaction, and the goal of preserving the premium products for the premium customer) etc. There is a higher level of revenue captured using this method over the other 2 as the curve shows a greater optimum price versus inventory flow.

Figure 6:
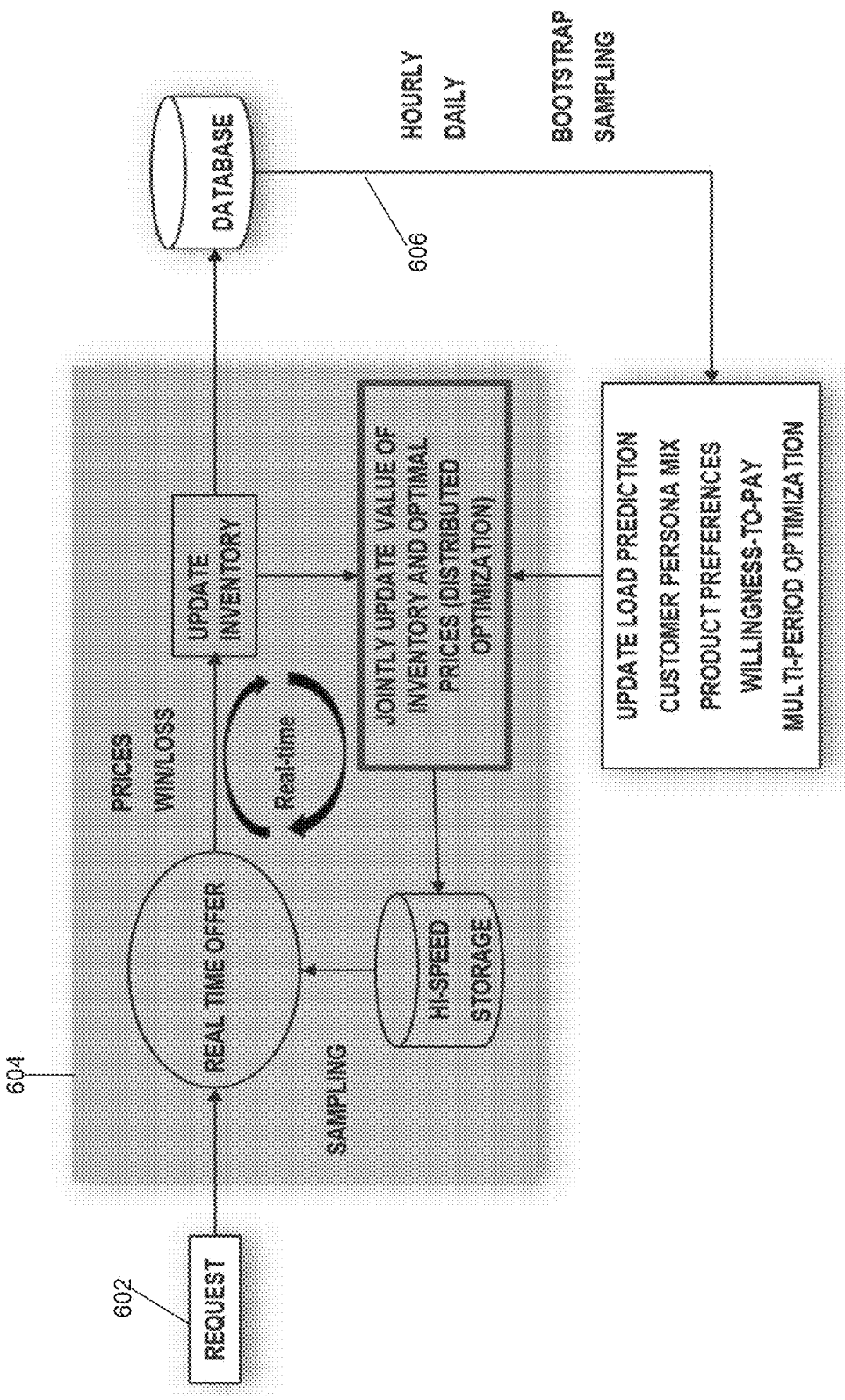
FIG. 6 illustrates a basic data process flow for the method processing.

FIG. 6 illustrates a basic data process flow for the method processing. The initial customer request (602) starts the transactional process, and the request is sent into a master data processing block (604) where distributed data and the processing pricing component that comprises multiple data and processing nodes, store copies of latest persona and time-period level data, wherein respective nodes receive tentative VOI signals, compute optimal prices in real-time, and transmit the results back to a master processor, within a response clock time limit. Also as time based feedback into this process, the system learns customer persona types and respective product choice preferences (606) using historical booking and inputs this data back into the distributed optimization processing block (604). The processing block (604) also factors in making a correct pricing decision against cost of making an incorrect pricing decision.

This large scale discrete optimization problem also takes into account a future customer persona mix arrival pattern as well as expected number of bookings, both of which are calculated using a Machine-Learning module, e.g., percentage of premium, mid-tier, and economy customer personas for future time periods. This prediction is periodically updated by re-acquiring latest purchase and customer attribute data from the database as shown in outer-loop on the right side of FIG. 6).

Figure 7:
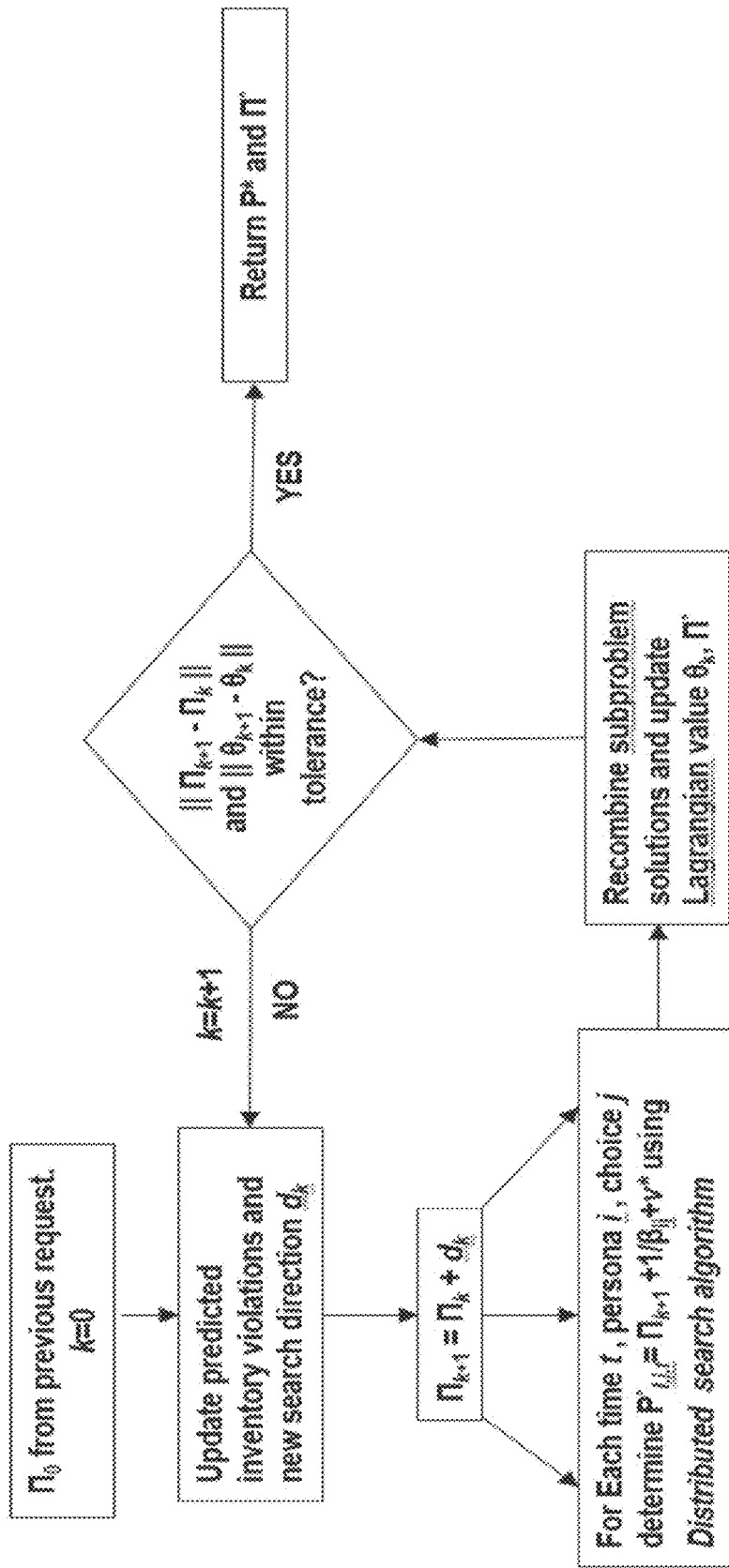
FIG. 7 illustrates the mathematical equations utilized in the pricing module and the flow of the calculations.

FIG. 7 illustrates the mathematical equations utilized in the pricing module and the flow of the calculations. Dynamic Pricing does not consider the personalized context of an incoming request and the latest availability. Typically, dynamic pricing is done when the bid prices are updated, e.g., 4 times a day. When far away from departure date, this approach may be adequate, but when the traffic rate is high (e.g. within a week of departure), this approach may be insufficient and inflexible. To support personalized real-time offers, an explicit value of inventory number is needed to update to re-optimize DPMIP in real-time. We solve this by noting two features:

A. The block-diagonal structure of this model. Aside from the availability constraints, the seat-pricing problem SPP is separable by time periods.

B. The number of value-of-inventory values=number of seat types. Which is relatively few (less than 100, usually less than 10).

Suppose we relax the inventory constraints via Lagrangian duals $\pi$ as shown below.

$$\sum_{j=1}^{S} \pi_j A_j \equiv V$$

$$V = \text{sum}(pi.A)$$

$$SPP(\pi): \text{Maximize } V + \sum_{t=1}^{T} \sum_{i=1}^{N} \sum_{j=1}^{S} (p_t^{ij} - \pi_j) A_t^{ij}$$

subject to:

$$A_t^{ij} \le n_t^i q_t^{ij}, \forall i, j, t$$

$$q_t^{ij} = \frac{e^{a_t^{ij} - \beta_{is} p_t^j}}{\sum_{k=1}^{S} e^{a_t^{ik} - \beta_{ik} p_t^k}}, \forall i, j, t.$$

S represents assortment size, e.g., the number of different product choices, as seen in the equation to represent 'q' above.

$A_t^{ij}$=expected number of units of product j purchased by customer persona i in time period t.

$n_t^i$=predicted number of customer persona i, in time period t.

$q^{ij}_t$=probability of customer persona i choosing product type j in time period t (an embodiment for this prediction is the multinomial logistical regression method)

This formulation has several advantageous properties:
1. SPP(π) is separable by time period and SPP(π) is separable by persona.
2. The win-probability structure is such that the optimal prices will be no less than the duals
3. The sales-demand constraint will be tight at optimality since there are no inventory constraints, Given this, the following independent subproblems can be solved in parallel via distributed computing and their solutions can be recombined to generate the full solution.

$$SPP_{i,t}(\pi): \text{Maximize} \sum_{j=1}^{S} (p_t^{ij} - \pi_j) \frac{e^{\alpha_t^{ij} - \beta_{is} p_t^j}}{\sum_{k=1}^{S} e^{\alpha_t^{ik} - \beta_{ik} p_t^k}}$$

SPP$_{i,t}$(π) is an easy problem to solve and reduces to a one-dimensional search (Gallego and Wang, etc.).

Summary of math: By taking the value of inventory as Lagrangian dual values, the problem can be decomposed into a multitude of one-dimensional search problems that can be executed using distributed computing. Next, it is shown how to update the Lagrangian duals themselves in real-time as and when availability reduces by one unit. The above structure suggests the following real-time value of inventory update method using a few iterations of the deflected sub-gradient algorithm (Sherali-Subramanian IJOC 2008). The intuition here is that the value of inventory will usually change by no more than a small amount after every price request. Note that this procedure can be executed as a continuously running 'daemon process' that constantly updates the value of inventory (and corresponding prices) for every seat type and every flight. Incoming requests use the latest π available values to do pricing. Since the price requests are satisfied taking the value of inventory into account, the optimal prices correspond to the subproblem solution for the current time period that are already calculated and stored.

Sub-gradient Optimization of Lagrangian Dual: Minimize (1≤π≤u): SPP(π)
1. Initialize $\pi_0 = \pi_{previous\_request}$. k=0.
2. Solve SPP$_{i,t}(\pi_k)$ by time period and persona, recombine and update best solution $\pi_k^*$.
3. Compute availability violations $\varepsilon_j$ to obtain deflected sub-gradient search vector $d_k$
4. If violations are within tolerance, or if the response time clock has ended, return $\pi_k$ to step 6.
5. $\pi_{k+1} \leftarrow \pi_k \lambda d_k$, where λ is a carefully chosen step-length. k=k+1. Return to step 2.
6. Output: Return the optimal price for an incoming request via) SPP$_{i,t}(\pi_k^*)$ that is already calculated.

In FIG. 7: $\theta_k$ represents the "Lagrangian objective function value corresponding to SPP($\pi_k$)", P* represents the offer-price vector, and $\pi_k$ represents the VOI values (Lagrangian dual values).

Figure 8:
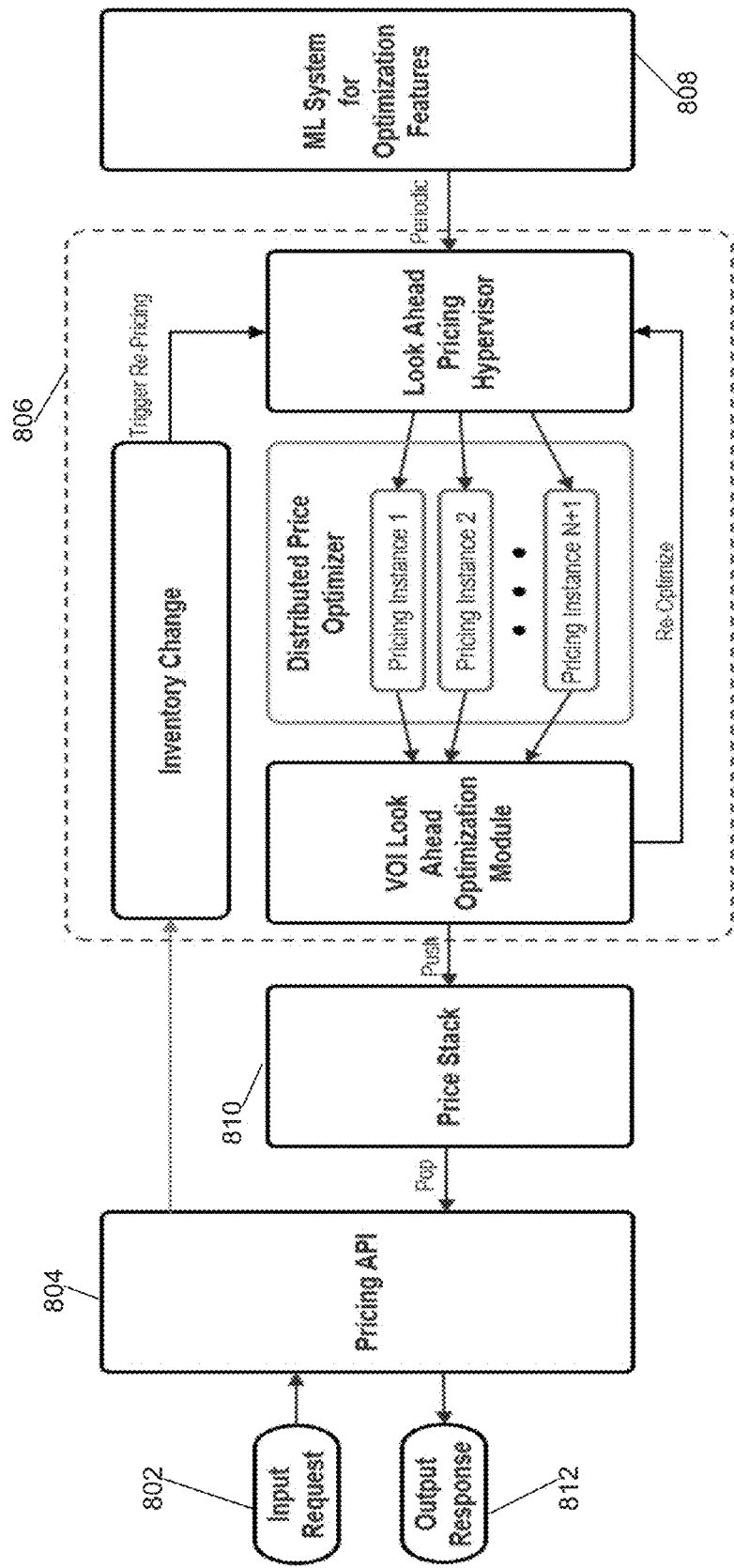
FIG. 8 illustrates individual data structure processing blocks or programming categories portrayed within a data flow.

FIG. 8 illustrates individual data structure processing blocks or programming categories portrayed within a data flow. This can be viewed in a similar perspective as FIG. 6. The initial customer request 802 is piped into a pricing API (application programming interface) 804 where there may be some re-formatting and then the data sent to the master processing module 806. As the core mathematics and complex programming is conducted in 806, additional external or historical data 808 is also supplied to 806 to further optimize pricing calculations. The result is a top priority pricing stack 810 which will contain the most likely options to resend to the customer as response 812. The stack is always updated after each transaction as to minimize additional computations for each request.

Figure 9:
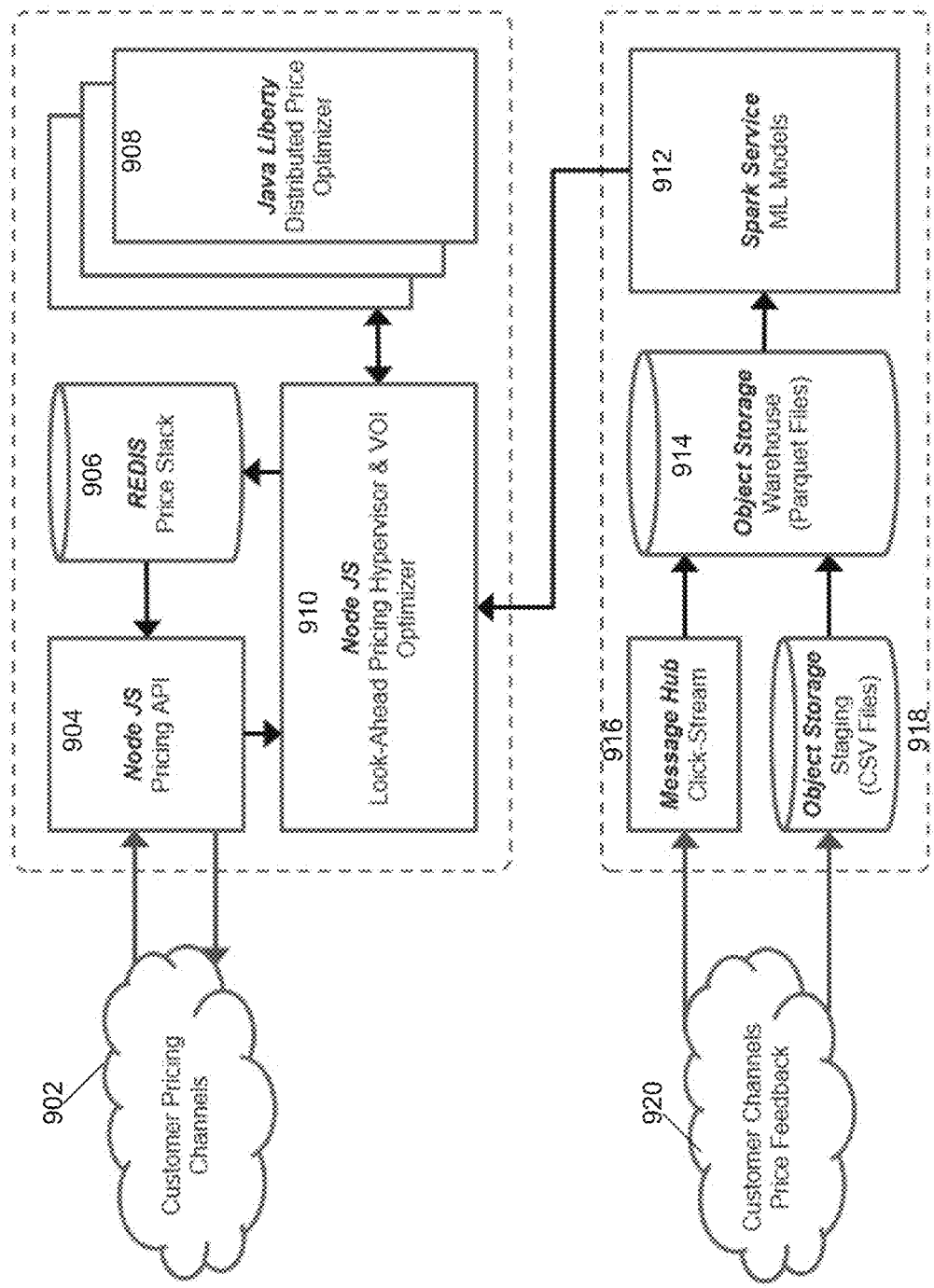
FIG. 9 illustrates the basic software structural architecture for the method.

FIG. 9 illustrates an embodiment that starts with customer pricing channels 902 as an initial input point. This drawing can be used in conjunction with FIGS. 6 & 8. Node 904 is a pricing API module which can be an input and output interface to a customer. Node 904 receives a latest price from REDIS price stack 906 which in turn is fed data by a look ahead pricing hypervisor and VOI optimizer 910. The look ahead pricing and VOI optimizer 910 interacts bi-directionally with module 908 which can run multiple threads of pricing algorithms Modules 908 and 910 can be primary software drivers behind developing and managing the price stack. Module 912 can be a primary interface from a customer historical profile data to an optimizer module 910 where the software takes into account customer patterns in the process of developing the price stack. Modules 914 and 918 are data storage repositories that are sent relevant customer data from various customer feedback channels 920 and a message hub 916. This data which can contain vital data such as customer profiles, historical preferences and willingness to pay is married into the pricing and VOI optimizer to account for all possible factors when generating a final price output.

Figure 10:
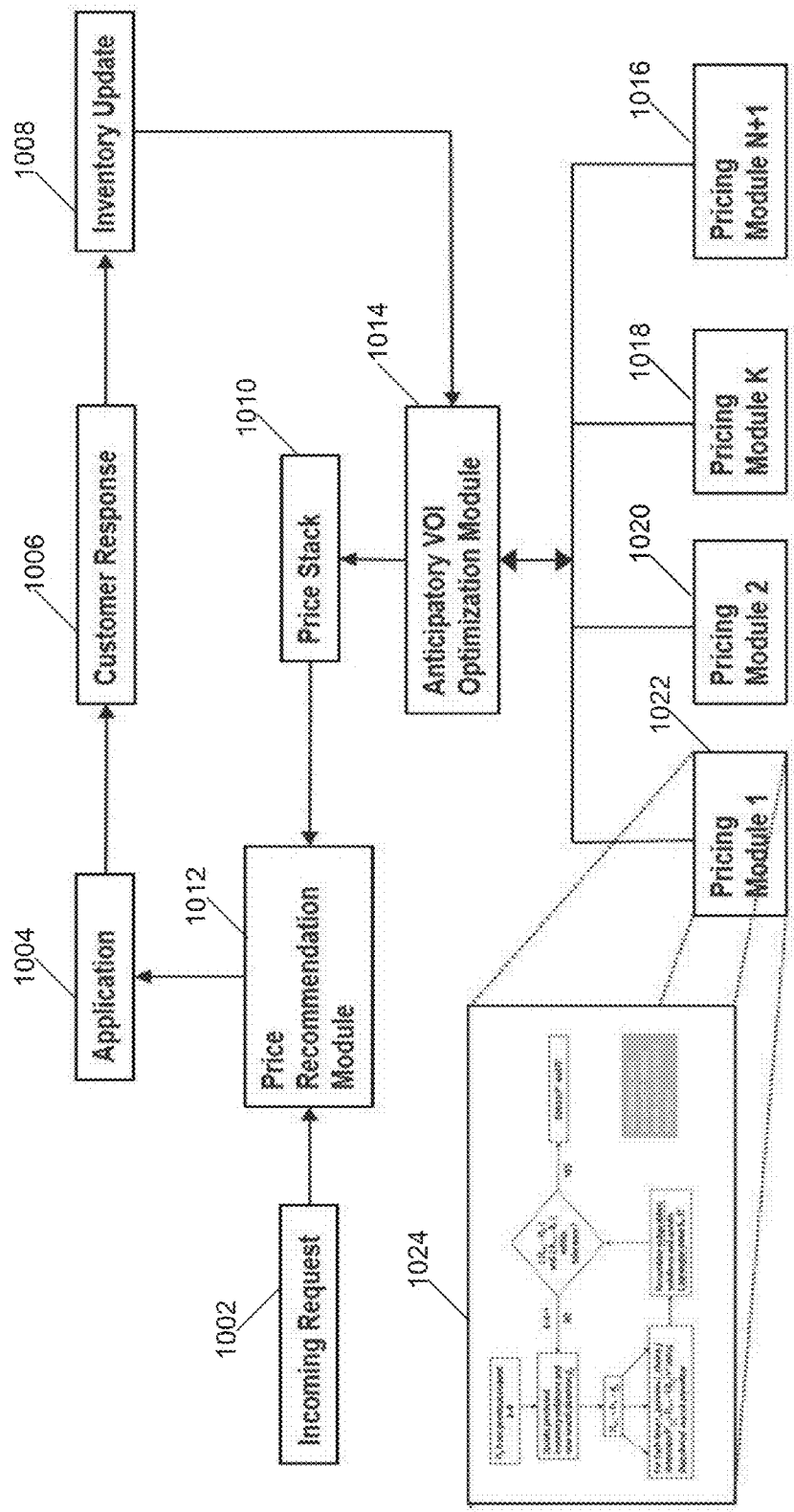
FIG. 10 illustrates a flow chart with a pricing module enhancement.
Figure 11:
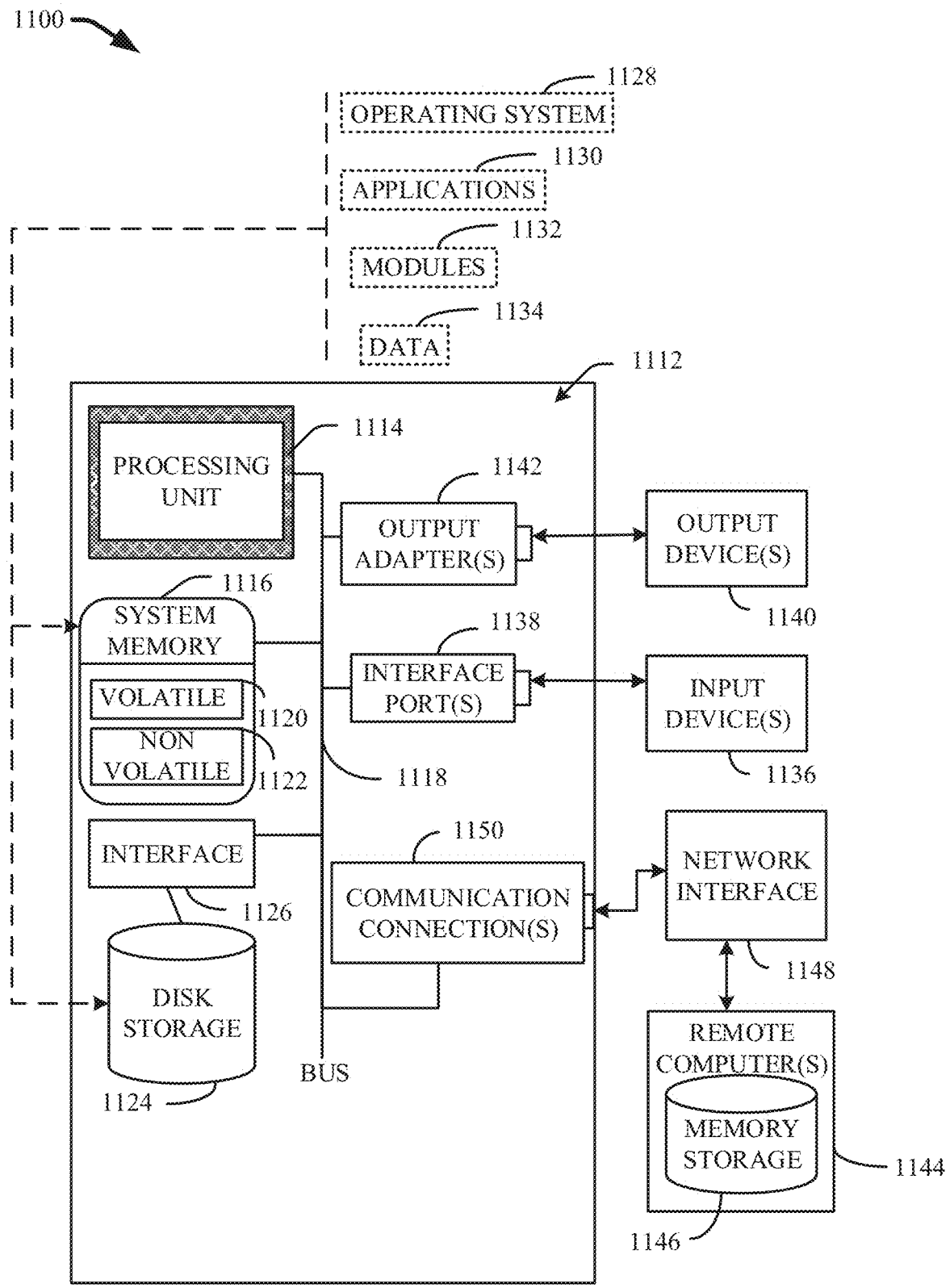
FIG. 11 is a schematic diagram of an example operating environment in accordance with one or more implementations described herein.

FIG. 10 illustrates a flow chart with content like prior drawings with a pricing module enhancement. An incoming price request is depicted in 1002 which shows its communication with module 1012 that supplies a recommended price. As also implied on FIG. 9, price stack 1010 is what provides data to the recommendation module and itself is provided the updated stack data from the look ahead pricing and VOI optimization module 1014. The multiple parallel threads performing many calculations are depicted in 1016, 1018, 1020, and 1022, referred to as pricing modules. Item 1024 depicts the mathematical flow and equations each one of the pricing module can process. The historical customer profiles are captured using the application 1004 and the customer response data 1006 and the data is stored in the inventory update 1008. The storage of this data would correspond to the storage repositories depicted in FIG. 9. As implied in FIG. 9, this storage data will be piped into the optimizer 1014 to update the price stack To provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

A suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/nonvolatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 8 also depicts software that acts as an intermediary between users and the basic computer resources described in the suitable operating environment 1101. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all the elements described relative to computer 1112. For purposes of brevity, only a memory storage device 1146 is illustrated with remote computer(s) 1044. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for compressing data during neural network training, comprising:
   a memory that stores computer executable components and neural network data;
   a processor that executes computer executable components stored in the memory, wherein the computer executable components comprise:
      an anticipatory value of inventory (VOI) optimization component that:

calculates optimal VOI and prices for immediate-future inventory levels of a product in parallel using a multiperiod nonconvex problem, wherein the anticipatory value of inventory (VOI) optimization component:
  deconstructs the multiperiod nonconvex problem into one dimensional searches using Lagrangian dual values for value of inventory;
  generates respective sliced work load processes for the one dimensional searches,
  distributes the respective sliced work load processes to respective processing devices of a distributed network architecture, and
  writes latest price updates for respective states of the immediate-future inventory levels to a price stack based on results of the respective sliced work load processes for the one dimensional searches, wherein there are different classes of the product;
a recommendation component that provides customized pricing recommendation for the product relative to a unique customer as a function of the latest price updates for the respective states to the price stack; and
an inventory optimization component that:
  reserves a defined quantity of a class of the product until a time window that the unique customer is predicted to have a highest likelihood of purchasing from the class of the product based on one or more characteristics of the unique customer; and
  in response to the time window arriving, makes the product available for the unique customer to purchase.

2. The system of claim 1, further comprising a distributed data and processing pricing component that comprises multiple data and processing nodes that store copies of latest persona and time-period level data, wherein respective nodes receive tentative VOI signals, compute optimal prices in real-time, and transmit the results back to a master processor, within a response clock time limit.

3. The system of claim 1, further comprising a recombination component that decomposes a discrete optimization problem into persona, product-type, and time-period specific calculations that can be performed independently and then recombined to calculate one or more VOI and price values for respective competing products and customer persona.

4. The system of claim 3, further comprising an offer component that merges an incoming customer persona's willingness-to-pay distribution, seat preferences, and future value of inventory distributions of product choices and generates a price offer.

5. The system of claim 1, further comprising a reinforcement learning component that learns customer persona types and respective product choice preferences using historical booking and offer data.

6. The system of claim 1, further comprising a utility component that factors benefit of making a correct pricing decision against cost of making an incorrect pricing decision.

7. The system of claim 1, further comprises a context component that collects context-based data regarding customers and wherein the recommendation component employs a sub-set of the context-based data to determine the customized pricing recommendation.

8. A computer-implemented method, comprising:
  calculating, by a system operatively coupled to a processor, optimal VOI and prices for immediate-future inventory levels of a product in parallel using a multiperiod nonconvex problem, wherein the calculating comprises:
    deconstructing the multiperiod nonconvex problem into one dimensional searches using Lagrangian dual values for value of inventory;
    generating respective sliced work load processes for the one dimensional searches,
    distributing the respective sliced work load processes to respective processing devices of a distributed network architecture, and
    writing latest price updates for respective states of the immediate-future inventory levels to a price stack based on results of the respective sliced work load processes for the one dimensional searches, wherein there are different classes of the product;
  providing, by the system, customized pricing recommendation for a product relative to a unique customer as a function of the latest price updates for respective states to the price stack;
  reserving, by the system, a defined quantity of a class of the product until a time window that the unique customer is predicted to have a highest likelihood of purchasing from the class of the product based on one or more characteristics of the unique customer; and
  in response to the time window arriving, making, by the system, the product available for the unique customer to purchase.

9. The method of claim 8, further comprising using a distributed data and processing pricing component that comprises multiple data and processing nodes to store copies of latest persona and time-period level data, wherein respective nodes receive tentative VOI signals, compute optimal prices in real-time, and transmit the results back to a master processor, within a response clock time limit.

10. The method of claim 8, further comprising decomposing a discrete optimization problem into persona, product-type, and time-period specific calculations that can be performed independently and then recombining to calculate one or more VOI and price values for respective competing products and customer persona.

11. The method of claim 10, further comprising merging an incoming customer persona's willingness-to-pay distribution, seat preferences, and future value of inventory distributions of product choices and generating a price offer.

12. The method of claim 8, further comprising learning customer persona types and respective product choice preferences using historical booking and offer data.

13. The method of claim 8, further comprising performing a utility-based analysis that factors benefit of making a correct pricing decision against cost of making an incorrect pricing decision.

14. The method of claim 8, further collecting context-based data regarding customers and employing a sub-set of the context-based data in connection with the computing of optimal prices in real-time.

15. A computer program product comprising a computer readable storage medium having program instructions embodied therewith, the program instructions executable by processor to cause the processor to:
  calculate optimal VOI and prices for immediate-future inventory levels of a product in parallel using a multiperiod nonconvex problem, wherein the calculating comprises:
    deconstruct the multiperiod nonconvex problem into one dimensional searches using Lagrangian dual values for value of inventory;

generate respective sliced work load processes for the one dimensional searches, distribute the respective sliced work load processes to respective processing devices of a distributed network architecture, and write latest price updates for respective states of the immediate-future inventory levels to a price stack based on results of the respective sliced work load processes for the one dimensional searches, wherein there are different classes of the product;

provide customized pricing recommendation for a product relative to a unique customer as a function of the latest price updates for respective states to the price stack;

reserve a defined quantity of a class of the product until a time window that the unique customer is predicted to have a highest likelihood of purchasing from the class of the product based on one or more characteristics of the unique customer; and in response to the time window arriving, make the product available for the unique customer to purchase.

16. The computer program product of claim 15, further comprising program instructions executable by processor to cause the processor to:

merge an incoming customer persona's willingness-to-pay distribution, seat preferences, and future value of inventory distributions of product choices; and generate a price offer.

17. The computer program product of claim 15, further comprising program instructions executable by processor to cause the processor to provide customized pricing recommendation for a product relative to a unique customer as a function of the latest price updates for respective states to the price.

18. The computer program product of claim 15, further comprising program instructions executable by processor to cause the processor to learn customer persona types and respective product choice preferences using historical booking and offer data.

19. The computer program product of claim 15, further comprising program instructions executable by processor to cause the processor to perform a utility-based analysis that factors benefit of making a correct pricing decision against cost of making an incorrect pricing decision.

20. The computer program product of claim 15, further comprising program instructions executable by processor to cause the processor to:

collect context-based data regarding customers; and employ a sub-set of the context-based data in connection with the computing of optimal prices in real-time.

* * * * *